W. H. DENLEY.
FILE OR LIKE CUTTING TOOL.
APPLICATION FILED MAY 20, 1911.

1,154,578.  Patented Sept. 21, 1915.

WITNESSES:

INVENTOR:
WILLIAM HENRY DENLEY

UNITED STATES PATENT OFFICE.

WILLIAM HENRY DENLEY, OF BIRMINGHAM, ENGLAND, ASSIGNOR OF ONE-HALF TO BENJAMIN MAKIN, OF SHEFFIELD, ENGLAND.

FILE OR LIKE CUTTING-TOOL.

1,154,578.   Specification of Letters Patent.   Patented Sept. 21, 1915.

Application filed May 20, 1911. Serial No. 628,557.

*To all whom it may concern:*

Be it known that I, WILLIAM HENRY DENLEY, subject of the King of Great Britain, residing at 38 Oakfield road, Cannon Hill, Birmingham, in the county of Warwick, England, have invented a new and useful Improvement in Files or like Cutting-Tools; and I do hereby declare the following to be a full, clear, and exact description of the same.

My invention comprises improvements in files or like cutting tools, and refers to that class which have what is termed "milling" teeth, *i. e.* teeth which have a long straight cutting edge as distinguished from the ordinary form of file teeth which terminate in points.

The object of my present invention is to provide a file of this type which shall be quicker and more effective in use than those heretofore provided.

According to my invention, I employ in combination a series of milling teeth extending in an inclined direction from edge to edge of the file, and a series of grooves disposed in an oppositely inclined direction across the file, forming short teeth each presenting a cutting edge.

Figure 1:
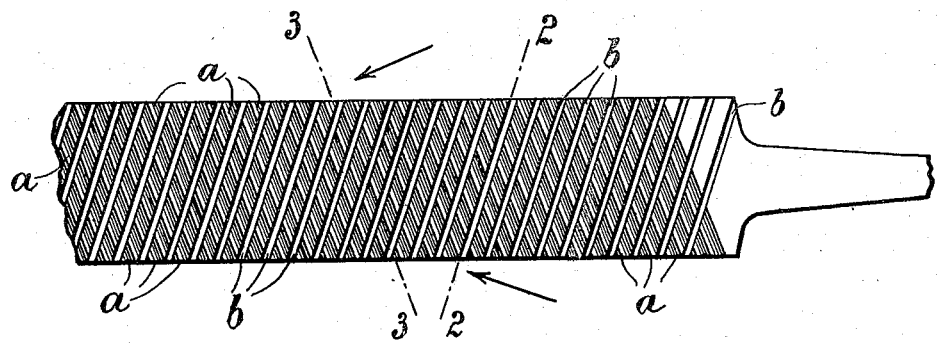
Figure 2:
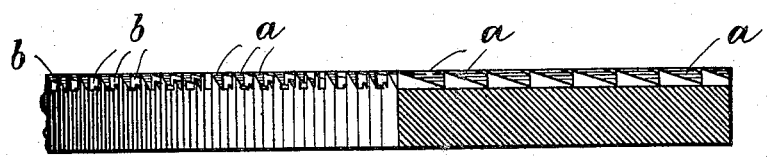
Figure 3:
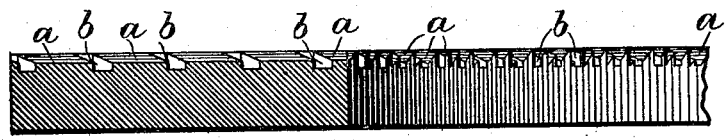

Referring to the drawings Figure 1. is a face view of a file according to my invention. Fig. 2. is a transverse section along a groove at 2—2 in Fig. 1. Fig. 3. is a similar section taken between two rows of teeth at 3—3 in Fig. 1.

In carrying my invention into practice as illustrated upon the accompanying drawings, I cut across the file by a milling tool or other means in an inclined direction, a series of parallel and straight grooves, these grooves being of such a form that they produce a series of parallel "milling" teeth. The front wall of the teeth is preferably substantially vertical, or slightly undercut, while from the apex, the teeth are "backed off" say at an angle of about 70 degrees. In an oppositely inclined direction across the file and teeth I cut a series of parallel straight or curved grooves which may be of square, channel, V, or half round, or other suitable section; these grooves dividing each of the milling teeth into short lengths, say of one eighth of an inch, or of any other suitable length.

In the accompanying drawings I have shown a file according to my invention, in which the teeth $a$ are formed by passing a milling cutter across the file in an inclined direction for a number of times, whereby teeth or cutting edges are formed extending from edge to edge of the file. According to my invention these long teeth are sub-divided by means of oppositely inclined grooves $b$ which are cut across the face of the file by a milling cutter or other means, whereby I provide a plurality of short and inclined teeth having a cutting edge as distinguished from a cutting point.

Each face of the file may be formed with teeth according to my invention, or only one surface as desired.

I wish it to be understood that by inclined teeth I mean an inclination at least as great as the pitch of the teeth, so that if a line be taken across the file at right angles at any point, such line would always traverse a tooth. This is a very great advantage over teeth extending across the file at right angles, for there is no liability in filing thin metal of such passing between the teeth and thus becoming locked.

I am aware that prior to my invention it has been proposed to make files with milling teeth extending from edge to edge of the file, the teeth being of substantially the same formation or section as those of a milling cutter; the long continuous cutting edge of these teeth "peeling" or planing off the metal under treatment as distinguished from the abrasive action of the ordinary file, and that it has been proposed to construct a file with milling teeth extending transversely across the file at right angles, the said teeth being divided into short lengths by a series of parallel grooves extending in an inclined or oblique direction across the file, and to such I make no claim.

What I claim then is:—

1. A file or like cutting tool having a series of milled teeth integral with the file and extending entirely across the file in an inclined direction, and a series of inclined grooves disposed in an oppositely inclined direction across the file, and intersecting the milled teeth at an acute angle.

2. A file or like cutting tool having a series of milled teeth integral with the file and extending entirely across the file in an inclined direction at an angle of about 60 degrees to 80 degrees to the edges of the file, and presenting an inclined cutting edge when the file is reciprocated longitudinally, and a series of grooves disposed in an oppositely inclined direction at substantially the same angle as the teeth and intersecting the same at an angle of about 60 degrees to 20 degrees.

In testimony whereof, I have signed my name to this specification in the presence of two subscribing witnesses.

WILLIAM HENRY DENLEY.

Witnesses:
HAROLD FORRESTER,
NORMAN S. BARLOW.

Copies of this patent may be obtained for five cents each, by addressing the "Commissioner of Patents, Washington, D. C."